US008769134B2

(12) United States Patent
Calder et al.

(10) Patent No.: US 8,769,134 B2
(45) Date of Patent: Jul. 1, 2014

(54) SCALABLE QUEUES ON A SCALABLE STRUCTURED STORAGE SYSTEM

(75) Inventors: Bradley Gene Calder, Bellevue, WA (US); Niranjan Nilakantan, Redmond, WA (US); Padmanabha Chakravarthy Uddaraju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/471,706

(22) Filed: May 15, 2012

(65) Prior Publication Data
US 2012/0226794 A1 Sep. 6, 2012

Related U.S. Application Data

(62) Division of application No. 12/605,706, filed on Oct. 26, 2009, now Pat. No. 8,266,290.

(51) Int. Cl.
*G06F 15/16* (2006.01)
*G06F 15/173* (2006.01)
*G06F 3/00* (2006.01)

(52) U.S. Cl.
USPC ............................ 709/229; 719/314; 709/206

(58) Field of Classification Search
None
See application file for complete search history.

(56) References Cited

U.S. PATENT DOCUMENTS

| 6,275,831 | B1 | 8/2001 | Bodnar et al. |
| 6,484,161 | B1 | 11/2002 | Chipalkatti et al. |
| 6,643,640 | B1 | 11/2003 | Getchius et al. |
| 7,046,687 | B1 * | 5/2006 | Brown et al. ............... 370/412 |
| 7,127,507 | B1 * | 10/2006 | Clark et al. ................. 709/224 |
| 7,139,280 | B2 * | 11/2006 | Mansour et al. ............ 370/412 |
| 7,158,964 | B2 * | 1/2007 | Wolrich et al. .................. 1/1 |
| 7,199,725 | B2 | 4/2007 | Gilfix et al. |
| 8,239,479 | B2 | 8/2012 | Sagar et al. |
| 2002/0162047 | A1 * | 10/2002 | Peters et al. ................... 714/5 |
| 2003/0028640 | A1 * | 2/2003 | Malik ........................ 709/226 |
| 2005/0183082 | A1 | 8/2005 | Lewites |
| 2008/0243945 | A1 | 10/2008 | Hanus et al. |
| 2008/0317068 | A1 | 12/2008 | Sagar et al. |
| 2010/0150120 | A1 * | 6/2010 | Schlicht et al. ............. 370/338 |
| 2010/0205157 | A1 | 8/2010 | Hanus et al. |

OTHER PUBLICATIONS

Amazon Web Services LLC (API Version Feb. 1, 2009 ) "Amazon Simple Queue Service Developer Guide", p. 1-2, 4, 8, 10-11.*
Sage A Weil (University of California, Santa Cruz, Dec. 2007) "Ceph: Reliable, Scalable, and High-Performance Distributed Storage", pp. 1-2 and 51.*
Notice of Allowance and Fee(s) Due in U.S. Appl. No. 12/257,786 mailed Mar. 25, 2013, 36 pages.
Notice of Allowance and Fee(s) Due in U.S. Appl. No. 13/619,307 mailed Apr. 24, 2013, 30 pages.

(Continued)

*Primary Examiner* — Peling Shaw
(74) *Attorney, Agent, or Firm* — Ben Tabor; Brian Haslam; Micky Minhas

(57) ABSTRACT

A cloud computing platform contains a structured storage subsystem the provides scalable queues. The cloud computing platform monitors message throughput for the scalable queues and automatically increases or decreases subqueues that provide the operational functionality for each scalable queue. A visibility start time and cloud computing platform time are maintained for each message to provide an approximate first-in-first-out order for messages within each subqueue. A message in a subqueue may be available for processing when the current cloud computing time is greater than the visibility start of the message.

20 Claims, 6 Drawing Sheets

(56) References Cited

OTHER PUBLICATIONS

Notice of Allowance, U.S. Appl. No. 12/619,307, mailed Aug. 7, 2012, 12 pp.

Non-Final Office Action in U.S. Appl. No. 12/257,786 mailed Oct. 9, 2012, 27 pages.

Notice of Allowance and Fee(s) Due in U.S. Appl. No. 12/257,747, mailed Sep. 16, 2013, 22 pages.

* cited by examiner

| ColumnName | Type | Use |
|---|---|---|
| AccountName 210 | PrimaryKey (string) | Stores Account Name. |
| Virtual QueueName 220 | PrimaryKey (string) | Stores Queue Name. This is the queue name seen by the application. |
| Subqueue Dictionary 230 | Dictionary | This is a dictionary (list of subqueues used for the virtual queue). |
| Metadata 240 | Dictionary | List of metadata associated with queue. |
| Virtual Queue Status 250 | Interger | State of the virtual queue to indicate if it is disabled or active. |

FIG. 2

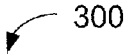

| SubqueueDictionary Fields | Type | Use |
|---|---|---|
| SubqueueID 310 | GUID (Dictionary Key) | The unique ID of the subqueue, which is randomly generated. |
| Subqueue Version 320 | String | Indicates the version/schema of the subqueue. This allows us to upgrade the schema of new subqueues, while keeping the existing queues at the older version. We then use the queues with the new schema to enqueue messages only and drain the old schema queues. This provides an easy way of changing the schema for the subqueues. |
| Subqueue State Permissions 330 | String | This is the State of the subqueue indicating if it can be used for enqueuing, and/or dequeuing and/or deleting messages. |

| ColumnName | Type | Use |
|---|---|---|
| SubQueueID 310 | PartitionKey | A unique hash value for each subqueue in a Virtual Queue. |
| AccountName 210 | PartitionKey | Storage Account Name |
| QueueName 220 | PartitionKey | The application defined Queue Name |
| VisibilityStartTime 410 | RowKey | This is the time in which the message will become visible and be a valid candidate for dequeing |
| MessageID 420 | RowKey (GUID) | Random GUID |
| ExpiryTime 430 | | Time when the row expires |
| InsertionTime 440 | | Time when the message is inserted |
| DequeueCount 450 | | The number of times a message is dequeued. |
| Body 460 | | MessageBody |

FIG. 4

SCALABLE QUEUES ON A SCALABLE STRUCTURED STORAGE SYSTEM

CROSS-REFERENCE TO RELATED APPLICATIONS

This application is a divisional of, and claims priority from, U.S. patent application Ser. No. 12/605,706, issued on Sep. 11, 2012 as U.S. Pat. No. 8,266,290, and filed Oct. 26, 2009, entitled "SCALABLE QUEUES ON A SCALABLE STRUCTURED STORAGE SYSTEM," U.S. patent application Ser. No. 12/605,706 is incorporated herein by reference in its entirety.

BACKGROUND

Conventionally, cloud computing platforms host software applications in an Internet-accessible virtual environment. The cloud computing platform allows an organization to use datacenters designed and maintained by third parties. The conventional virtual environment supplies small or large organizations with requested hardware resources, software application resources, network resources, and storage resources. The virtual environment also provides application security, application reliability, application scalability, and availability.

The conventional datacenters provide the physical computing resources, physical storage resources, and physical network resources. The physical resources in the data center are virtualized and exposed to the organizations as a set of application programming interfaces. The organizations do not need to maintain their own hardware resources or software resources, or maintain datacenters that are reliable and scalable.

The organizations may access these physical resources efficiently through the virtual environment without knowing the details of the software or the underlying physical hardware.

SUMMARY

Embodiments of the invention relate in one regard to a cloud computing platform, computer-readable media, and computer-implemented methods that provide scalable queues in a structured storage subsystem. The cloud computing platform implements the scalable queues using the structured storage subsystem.

The cloud computing platform includes the structured storage system, front-end servers, and virtual queue managers. The front-end servers receive application requests to create a scalable queue or to add messages to an existing scalable queue. In turn, the structured storage subsystem is manipulated by one or more table servers that receive the application requests from the front end server and that format the application requests in appropriate scalable queue commands for the structured storage subsystem. The virtual queue manager monitors the scalable queue. The front-end server requests the table server to perform appropriate load balancing on the structured storage subsystem when thresholds are reached in the tables storing the data for the scalable queues. The thresholds may be predetermined or assigned dynamically.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the invention are described in detail below with reference to the attached figures, which are incorporated by reference herein and wherein:

FIG. 2 is a schema diagram that illustrates an exemplary virtual queue data structure stored on the structured storage subsystem in accordance with embodiments of the invention;

FIG. 3 is a schema diagram that illustrates an exemplary subqueue data field in the virtual queue data structure stored on the structured storage subsystem in accordance with embodiments of the invention;

FIG. 4 is a schema diagram that illustrates an exemplary message data structure stored on the structured storage subsystem in accordance with embodiments of the invention;

DETAILED DESCRIPTION

Figure 1:
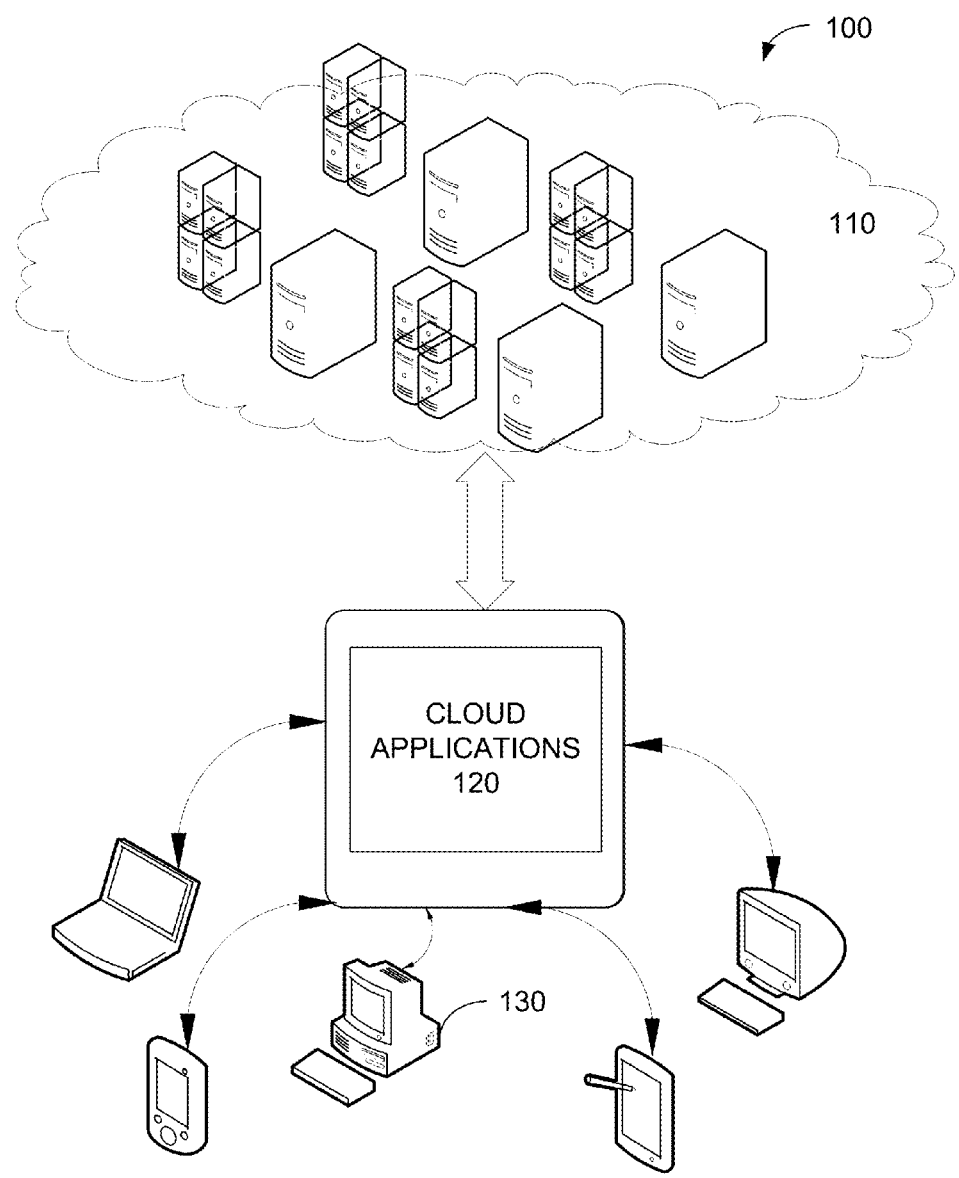
FIG. 1 is a network diagram that illustrates an exemplary computing system in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "dequeue" represents an operation on the scalable queue where a message is obtained and temporarily made invisible, by a computing resource, from the scalable queue.

Embodiments of the invention provide a cloud computing platform having scalable queues that are used to communicate messages. The cloud computing platform includes the structured storage system, front-end servers executing a number of cloud applications, and virtual queue managers. In some embodiments, the scalable queues are implemented on the structured storage system within the cloud computing platform. The scalable queues allow asynchronous message delivery among the applications executing on the cloud computing platform. The scalable queues may leverage the durability, replication, scalability, and load balancing provided by the structured storage system. This allows the cloud computing platform to automatically load balance access to the scalable queue by reusing the infrastructure mechanisms maintained for the structured storage systems across servers in the cloud computing platform without replicating these infrastructural mechanisms for the scalable queues.

In certain embodiments, the structured storage system serves blobs, tables, and queues from the same storage devices and the same table servers. The structured storage system load-balances the blobs, tables, and scalable queues across the table servers based upon several factors for the usage of the queue or blob or table entities. These range from how many requests per second is occurring to the different queue/blob/table partitions to the average latency of these operations to combinations of these metrics (e.g., multiplying them together). Each table server may process thousands of requests per second. Accordingly, the virtual queue manager may monitor how many requests are being processed and the number of messages stored in a scalable queue to automatically provide additional subqueues or to reduce the number of subqueues when the number of messages is low. The virtual queue manager also updates the state of each of subqueues.

In one embodiment, the structured storage subsystem is a log plus checkpoint-based structured storage system, which is implemented on top of a durable distributed file system (DFS) connected to one or more table servers in the cloud computing platform. The log may be an append-only log. The operations performed, by a table server, on the scalable queue are stored in the structured storage subsystem. The structured storage subsystem may commit the operations to physical storage devices associated with the structured storage subsystem and memory by updating both the append-only log and a memory table, which is maintained only in the memory of the table server. After successfully updating both the log and memory, an acknowledgment may be communicated from the structured storage subsystem to the front-end application that requested the operation. Accordingly, if a table server fails, the memory table can be recreated by replaying the log.

Subsequent operations on updated messages in the scalable queue are performed from information stored in the memory table. When the memory table grows large enough, it is checkpointed into a checkpoint file of the DFS, and the log is truncated. In some embodiments, subsequent operations may be performed from information stored in the checkpointed file.

In one embodiment, when a message in a structured storage subsystem is enqueued and then dequeued before the memory table is checkpointed, the table server may exclude the original message enqueued from the checkpoint, and the memory table row with a visibility start time and the dequeue operation need to be part of the checkpoint. Also, when a message is enqueued, dequeued, and then deleted before the memory table is checkpointed, none of these message states or operations need to be stored in the checkpoint. In other words, when a scalable queue is having messages enqueued, dequeued, and then deleted at a fast rate, then all of those operations may result in memory table operations and commits to the append-only log. But the checkpoints in storage for the scalable queue can be relatively small or even empty, which may save valuable disk inputs/outputs.

Additionally, the structure storage subsystem may provide the scalable queues in the cloud computing platform by automatically scaling the throughput via virtual queues having subqueues built on the structured storage subsystem. The messages in the scalable queues are stored in a table associated with the virtual queue so that a specially formed query—a dequeue operation—can quickly obtain messages from the scalable queue. The table in the structured storage system includes a partition for each subqueue and then each subqueue has a row to efficiently and accurately manage the head of the scalable queue and queue count.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, redundant arrays of inexpensive disks (RAID), and other magnetic storage devices. These memory technologies can store data momentarily, temporarily, or permanently.

A computing system provides cloud applications executed by the cloud computing platform to client devices. The client devices run the cloud application using resources (hardware, storage, network) provided in the cloud computing platform. The cloud computing platform may run the cloud application on virtual machines instantiated in the cloud computing platform.

FIG. 1 is a network diagram that illustrates an exemplary computing system 100 in accordance with embodiments of the invention. The computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains the structured storage subsystem. The structured storage subsystem stores the cloud applications 120 and messages exchanged between the devices that are part of the cloud computing platform 110. The devices include processors, storage disks, and network switches. The devices store and execute the software that provide the cloud applications 120. The cloud computing platform 110 connects to the client devices 130 via a communications network, such as a wireless network, local area network, wired network, or the Internet.

The cloud applications 120 are provided to the client devices 130. The software executed on the cloud computing platform 110 implements the cloud applications 120. The cloud applications 120 may include editing applications, network management applications, finance applications, or any application requested or developed by the client devices 130.

The client devices 130 are utilized by a user to interact with cloud applications provided by the cloud computing platform 110. The client devices 130, in some embodiment, must register with the cloud computing platform 110 to access the cloud applications 120. Any client with an account from the cloud computing platform 110 may access the cloud applications and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive application results.

Accordingly, the computing system 100 is configured with a cloud computing platform that provides cloud application to the client devices 130. The cloud applications remove the burden of updating and management of multiple local applications from the client devices 130.

In an embodiment, the cloud computing platform provides scalable queues through its structured storage system. The structured storage system may include tables that store messages generated by the cloud application executed on the cloud computing platform. The messages are stored in scalable queues that are built on tables within the structured storage system.

FIG. 2 is a schema diagram that illustrates an exemplary virtual queue data structure 200 stored on the structured storage subsystem in accordance with embodiments of the invention. The virtual queue data structure 200 includes, an account name 210, virtual queue name 220, subqueue dictionary 230, metadata 240, and virtual queue status 250.

The structured storage subsystem may implement the scalable queue as a virtual queue data structure 200 using a table. The table may include a column for the account name 210, virtual queue name 220, subqueue dictionary 230, metadata 240, and virtual queue status 250. The account name 210 stores the account name provided by the client device. The account name 210 may be a string that is part of a primary key for the table. The virtual queue name 220 is the name chosen by the cloud application executing on the cloud computing platform. The virtual queue name 220 may be string that is part of a primary key for the table. The subqueue dictionary 230 stores a list of physical subqueues implemented for the virtual queue. The subqueue dictionary 230 may be a dictionary that stores a reference to the list of subqueues. The metadata 240 stores any, user-defined, information about the scalable queue. The metadata 240 may be a dictionary that stores a comment. The virtual queue status 250 indicates whether the scalable queue is disabled or active. The virtual queue status 250 may be an integer, such as 0, 1, that indicates the current status. In one embodiment, 0 means disabled. Additionally, the virtual queue status 250 may includes permissions, such as read, write, delete, or any combination of these permissions for the scalable queue.

In some embodiments, the scalable queue in the cloud computing platform is a virtual queue comprising one or more subqueues. The subqueues in the cloud computing platform are stored in the structured storage subsystem. The subqueues allow the virtual queues to automatically scale based on the throughput, e.g., number of messages processed per second, of the subqueue.

FIG. 3 is a schema diagram that illustrates an exemplary subqueue data field in the virtual queue structure stored on the structured storage subsystem in accordance with embodiments of the invention. The subqueue data field is a data structure that represents the subqueue dictionary that lists each subqueue for the virtual queue. The subqueue data structure includes a subqueue identifier 310, subqueue version 320, and subqueue permissions 330.

The structured storage subsystem may implement virtual queue as a table with the subqueue as a field. The subqueue data field represents a dictionary, which may include a column for the subqueue identifier 310, subqueue version 320, and subqueue permissions 330 for each subqueue associated with the virtual queue. The subqueue identifier 310 stores a randomly generated identifier of the subqueue. The subqueue identifier 310 may be a primary key and a globally unique identifier (GUID) in the table.

The subqueue version 320 stores the version of the subqueue. The subqueue version 320 may be a string that specifies the schema of the subqueue. The subqueue version 320 allows the cloud computing platform to upgrade the schema of new subqueues while keeping existing subqueues at a previous schema name chosen by the cloud application executing on the cloud computing platform. The storage subsystem may create subqueues with the new version, and then enqueue messages to only subqueues with the new schema and drain the messages from the subqueues with the previous schema. Then once all of the subqueues of the old version are gone, they can be deleted. The subqueue permissions 330 store the permissions of the subqueues.

The subqueue permission 330 is a string that provides the following permission: all operations, all-operations-except-put, and disabled. When the subqueue is in the all operations state, any of a put, get, delete, peek, and clear operation may be performed on the messages in the subqueue. When the subqueue is in the all-operations-except-put state, get, delete, peek, and clear operations may be performed on the messages in the subqueue, and the enqueue message operations are not allowed for the subqueue. When the subqueue is in the disabled state, no operation may be performed on the messages in the subqueue.

In some embodiments, the messages in the scalable queue are implemented in a table. The messages include a visibility start time that provide a processing order for messages in the subqueue. The table servers access the table stored in the structured storage system to process the messages in each subqueue.

FIG. 4 is a schema diagram that illustrates an exemplary message data structure stored on the structured storage system in accordance with embodiments of the invention. The message data structure 400 includes, the subqueue identifier 310, account name 210, the virtual queue name 220, a visibility start time 410, a message identifier 420, an expiry time 430, an insertion time 440, a dequeue count 450, and a message body 460.

The structured storage system may implement the messages using a table. The table may include a column for the subqueue identifier 310, account name 210, the virtual queue name 220, the visibility start time 410, the message identifier 420, the expiry time 430, the insertion time 440, the dequeue count 450, and the message body 460. The subqueue identifier 310 stores the identifier for each subqueue in the structure storage system. In some embodiments, the subqueue identifier 310 may be a hash value based on the messages stored in the subqueue. The subqueue identifier 310 may be part of a partition key that identifies a partition within the table of the structured storage system. The account name 210 stores the account name provided by the client device. The account name 210 may be a string that is part of the partition row in the table. The virtual queue name 220 is the name chosen by the cloud application executing on the cloud computing platform. The virtual queue name 220 may be a string that is part of the partition key for the row. In one embodiment, the primary key for each message may be a combination of the partition key and row key.

The visibility start time 410 stores a time when the message is available for dequeuing. The visibility start time 410 may be part of a row key that identifies rows for the subqueue within the message table. The message identifier 420 may be a randomly generated identifier, which is globally unique in some embodiments. The message identifier 420 may also be part of the row key for the message table. The expiry time 430 stores the time when a row in the message table expires. The insertion time 440 stores the time when a message is inserted into a row in the message table. The dequeue count 450 stores the number of dequeue operations performed on each message in the message table. The body 260 stores the content of the messages in the message table.

In another embodiment, a structured storage system may include a table server, queue manager, and tables. Front end servers transmit application requests to the structured storage system. In turn, the application requests may be processed by the structured storage system on a table server.

Figure 5:
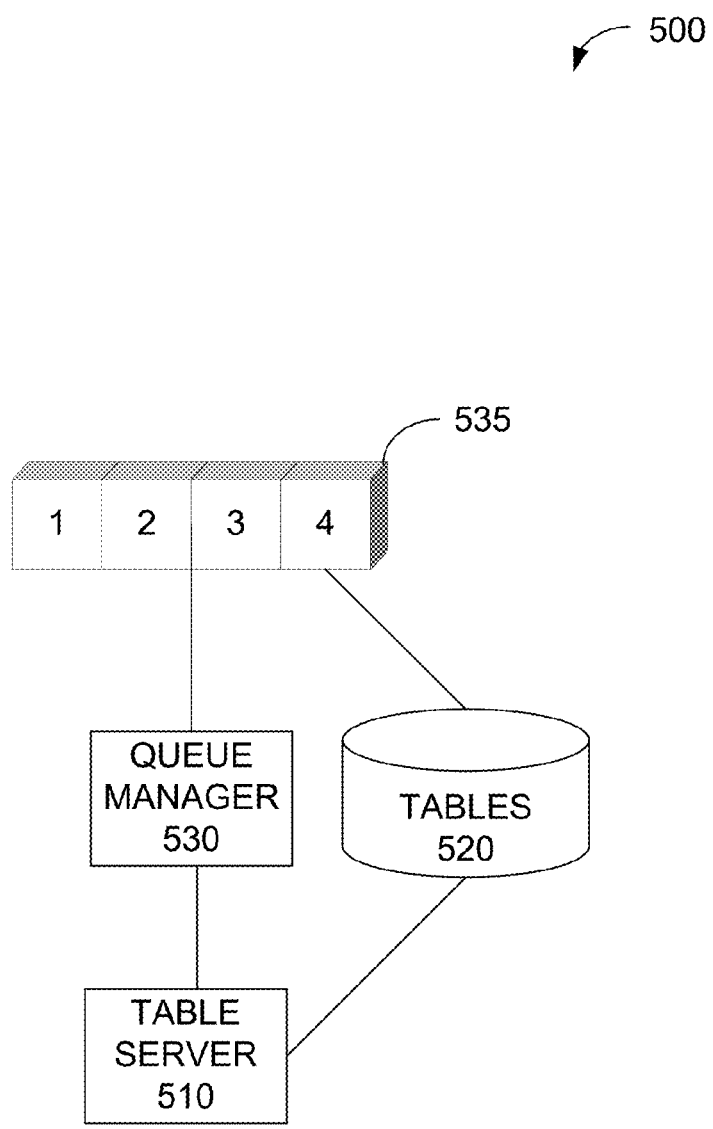
FIG. 5 is a block diagram that illustrates an exemplary scalable queue implemented on the structured storage subsystem of a cloud computing platform in accordance with embodiments of the invention.

FIG. 5 is a block diagram that illustrates an exemplary scalable queue 535 implemented on the structured storage system 500 of a cloud computing platform in accordance with embodiments of the invention. The structured storage system 500 includes table servers 510, table partitions 520, queue managers 530. In certain embodiments, the queue manager functionality may be incorporated into a front-end server or table server.

In one embodiment, the structured storage system 500 also includes storage nodes storing partitions for the various tables in the system. The virtual queue table and message table are stored in the storage nodes. The structured storage system split each table into partitions based upon the partition key boundaries. The partitions are served across by table servers 510 assigned to clusters of storage nodes. The structured storage system 500 monitors access patterns of the partitions and automatically load balances the partitions across the table servers 510 to distribute the load among the storage nodes.

A partition map cached by the front end servers may identify table servers 510 that are responsible for each partition in the structured storage system 500. In one embodiment, the front end servers locate virtual queue information from the structured storage system 500. The application requests received by the front-end servers are transmitted to the appropriate table server. In one embodiment, the partition map cached by the front-end server may be used to identify the table server for the application request.

The table servers 510 manage tables stored in the structured storage system 500. The table servers 510 receive application requests from the front end servers in the cloud computing platform. In certain embodiments, when the front end servers receive the application requests, the front end servers communicate with a table server 510 to locate the virtual queue the request is accessing and retrieve the virtual queues state and list of its subqueues. Then the front end servers performs the application request on messages in one of the active subqueues. The application request is transmitted to the table server serving the table partitions for a selected active subqueue. The table server 510 managing the table partition for the selected subqueue performs the appropriate operations on the message to complete the application request.

In one embodiment, the front-end server obtains a list of subqueues for the scalable queue 535 by communicating with the table server. The list may contain 1 to N subqueues. If the scalable queue 535 has zero subqueues, the front end server defaults to one subqueue. If there is only one subqueue, the command generated by the front end server is sent only to the relevant table server for the identified subqueue based upon the partitions served at the table server. If there is more than one subqueue, however, the front end server selects the subqueue to process the request. Or the front end server may select a set of subqueues to process the request if there is more than one valid subqueue required to be accessed for the given type of request (e.g., get virtual queue size).

The table server 510 may process the row to validate the key, and insert or retrieve messages in the identified subqueue. In turn, an appropriate command is generated by the table server to access the subqueue, traverse a message table associated with the subqueue, select a message, and perform the appropriate operation on the message table.

In some embodiments, each application is associated with a storage account. The storage accounts are the highest level in the namespace for the computing cloud platform. The storage accounts allow registered applications to access the scalable queues 535 and their messages. In some embodiments, a storage account is created via a portal web interface to the cloud computing platform. For instance, in response to an application request received by the front end server, a request to inset a raw in the virtual queue table is transmitted to the table server 510. The table server accesses the virtual queue table and inserts the row in the virtual queue table to create a scalable queue 535 in the cloud computing platform. The scalable queue 535 may be accessible via Internet uniform resource locators, such as http://<account>.queue.core.windows.net/<QueueName>. In some embodiment, the structured storage system 500 supports both hypertext transfer protocol (HTTP) and hypertext transfer protocol secure (HTTPS). The storage account name is specified as the first part of the host name followed by the term "queue." The host name is followed by the "queue name," selected by the application. The Internet uniform resource locator may be used to locate and send messages to the appropriate structured storage system.

In another embodiment, after registering for the account, a user may receive a 256-bit secret key, which is used to authenticate, in the structured storage system, requests of cloud applications selected by the user. Specifically, each application request may be signed using the secret key with a keyed hash message authentication code (HMAC) implemented with a secure hash algorithm (SHA-256). In turn, the signature is passed with each request from the front end servers to the structured storage system. And the front end servers authenticate the requests by verifying the HMAC-SHA signature.

In certain embodiments, each scalable queue 535 is comprised of one or more subqueues stored in the messages table of the structured storage system 500. The table servers 510 perform operations on the messages table to process the messages for a subqueue. Each subqueue may be served from a partition in the structured storage system. And each subqueue is stored as part of the messages table managed by a table server 510. Accordingly, all of the requests for messages in a single subqueue are served from a single table server 510 to correctly maintain counts and other state information for the subqueue.

The messages generated in response to the application request may be stored in subqueues in the structured storage system 500. In some embodiments, the structured storage system 500 automatically deals with load balancing when a table server 510 fails or a given table server 510 becomes too busy. For instance, the structured storage system 500 may contain thousands of table servers 510 that serve messages stored in subqueues and corresponding table partitions. Because a subqueue has all of its requests processed by one table server 510, which may at most process N, e.g. 1,000, requests per second due to hardware limits (CPU, memory, network, etc.), the structured storage system automatically balances the load among all subqueues for the virtual scalable queue in the structured storage system.

If a scalable queue 535 needs to process more requests than the first threshold (e.g., 1,000 requests per second per partition) set by resource limits, the structured storage system 500 creates multiple subqueues for the scalable queue 535. The structured storage system 500 automatically scales out the throughput of the virtual queue to N*Q, where Q is the number of subqueues automatically created to implement the scalable queue 535. The user of the structured storage system does not have to worry about the throughput of the scalable queue 535 used by their application, because the scalable queue 535 grows or shrinks based on the current needs of the application. Moreover, the applications may use a single scalable queue 535 instead of managing multiple queues.

In one embodiment, the table partitions 520 are stored by the table server 510 into a stream layer of the structured storage system 500. The stream layer provides a durable and scalable distributed file system. This allows any table server 510 of the structured storage system 500 to access any table partition 520 within the structured storage system 500. The table partitions 520 include a virtual queue table and a message table. The table partitions 520 are processed by the table server 510, which stores them across the stream layer in the structured storage system 500. The table server 510 accesses the tables with appropriate operations to perform the application requests. In one embodiment, all of the subqueues and messages across the different subqueues may be stored in a single table on the structured storage system 500. In one embodiment, the virtual queue table, among other things, identifies the scalable queue 535, a list of subqueues associated with the scalable queue 535 and the state of the scalable queue 535. The subqueue dictionary data structure for each virtual queue, among other things, identifies each subqueue and its state. The message table identifies, among other things, each message and its corresponding subqueue.

In one embodiment, all messages in the scalable queue are stored in the message table. The structured storage system 500 automatically monitors traffic to the partitions associated with each subqueue and automatically load balances the different partitions with different table servers 510. The partition key—subqueue identifier, account name, and virtual queue—allows the table servers 510 to monitor the traffic to each of the subqueues. Also, the table servers 510 may use the partition key to load balance message table partitions based upon the traffic. In some embodiments, a subqueue cannot be split across partitions. A partition contain one to many subqueues but a subqueue can only be contained in one table partition. The structured storage system 500 automatically provides these efficiencies because the message table is implemented by scalable structured storage tables in the structured storage system 500.

The subqueues of the scalable queue 535 may be organized as range partitions of the structured storage system 500. In one embodiment, the range partitions for the message table may contain a group of partitions based upon the partition key, which is the subqueue identifier. For instance, a scalable queue 535 may comprise five subqueues with the following subqueue identifiers: A, B, C, D, and E. The structured storage system 500 may group the subqueues into two range partitions: A+B partition and C+D+E partition. The structured storage system 500 selects the grouping based on the alphanumeric values of the subqueue identifiers and the load on the table servers. The structured storage system 500 may split A+B partition into two new range partitions to be processed on different table servers when the load to the A+B partition increases beyond the threshold limit for the table server 510 managing the A+B partition.

The subqueues in the structured storage system 500 may belong to different storage accounts or scalable queues 535. But the subqueue message table may store all of the messages for each subqueue associated with each storage account and each scalable queue 535. In one embodiment, subqueues for each scalable queue 535 may be randomly hashed by the structured storage system 500 across the subqueue message table, and this then becomes the subqueue identifier. When the structured storage system 500 adds a new subqueue to the scalable queue 535 the new subqueue may be mapped to a different range partition than the other subqueues that already exist for that scalable queue 535. The new subqueue may map to different table servers 510 because the partition range of the new subqueue identifier is not within a range of the tables servers 510 managing the partitions for the existing subqueues of the scalable queue 535. Accordingly, when the existing subqueues start to get throttled due to too many requests for them to handle additional subqueues are added by the queue manager to meet the traffic demands for the scalable queue 535. In an alternate embodiment, the scalable structured storage system 500 may split the subqueues into new range partitions and load balance the messages across different table servers 510 if the current table server cannot handle the load to a given range partition of subqueues.

In certain embodiments, the subqueues of each scalable queue 535 and the messages across the different subqueues are stored in a single table 520 of the scalable structured storage system 500. Additionally, the structured storage system 500 is built on a distributed file system (DFS) that provides replication to ensure durability in the case of failures, e.g., data bit rot, disk failures, rack failures, datacenter failures, etc. Accordingly, the scalable queue 535 and its messages have durability of the replication by the stream layer of the (DFS).

The table servers 510 manage access to the subqueue message table 520, provide efficient processing of messages at a high throughput rate, and maintain the state information for each subqueue.

The table servers 510 implement several commands on the subqueue message table based on the requests received from the front end server applications. The message-level command may be performed by table servers 510 that access routines associated at http://<account>.queue.core.windows.net/<QueueName>/messages. In certain embodiments, the commands may include the following: PutMessage, GetMessages, PeekMessages, DeleteMessage, and ClearQueue.

The PutMessage command adds a new message to the scalable queue 535. In some embodiments, the message is added to the back of the scalable queue 535. In alternate embodiments, a priority may be used to determine insert location or a front insert may be selected for messages for certain applications. The PutMessage receives parameters, such as the name of the scalable queue 535, the content of the message, and a message time-to-live. The time to live specifies the time-to-live interval for this message. In one embodiment, the maximum time-to-live allowed is 7 days. If this parameter is omitted, the default time-to-live is 7 days. If a message is not deleted from a queue within its time-to-live, then it will be garbage collected and deleted by the structured storage system 500.

The PutMessage operation causes the structured storage system 500 to check the availability of the scalable queue 535. When the scalable queue 535 is disabled, the message is rejected. When the scalable queue 535 is active, the structured storage system 500 reads the virtual queue table to get the list of subqueues that are associated with the scalable queue from the subqueue dictionary field in the virtual queue table. A subqueue with an all-operations-allowed state is selected by the structured storage system 500. At least one subqueue associated with the scalable queue 535 is guaranteed to be in the all-operations-allowed state, if the scalable queue 535 is active. In one embodiment, when multiple subqueues are in the all-operations allowed state, the structured storage system 500 may randomly pick a subqueue. In an alternate embodiment, the subqueue is selected based on the number of messages stored in the different subqueues. For instance, the subqueue with the least number of messages may be selected by the structured storage system 500. In turn, the new message is then inserted into the selected subqueue by the structured storage system in response to the PutMessage.

The GetMessages command causes the structured storage system 500 to retrieve X messages from the front of the scalable queue 535. The GetMessage receives parameters such as queue name, number of messages, and visibility timeout. In one embodiment, the visibility timeout is an integer that specifies the message's visibility timeout in seconds. The maximum value may be 7,200 seconds (2 hours). The default message visibility timeout may be 30 seconds. Upon retrieving the messages, the structured storage system 500 sets the message to be invisible for the visibility timeout period. If a message is not deleted by the structured storage system 500, the message will reappear on the scalable queue 535 after its visibility timeout expires. In some embodiments, the GetMessage command may return message identifiers for the messages returned along with PopReceipts. The PopReceipt may be a string which is returned for every message when performing a dequeue operation on the message in response to the GetMessage command. The PopReceipt along with the message identifier is required to delete a message from the scalable queue 535. The message identifier may be an identifier, such as a globally unique identifier (GUID), that identifies the message in the scalable queue 535.

The structured storage system 500 returns messages in an approximate first-in-first-out order in response to the GetMessage command. In some instances, a message may be returned more than once by the structured storage system 500 due to the invisibility time. In one embodiment, the GetMessage command causes the structured storage system 500 to select subqueues based on the state. For instance, a subqueue with a state of nondisabled may be selected by the structured storage system 500 from a list of nondisabled subqueues associated with scalable queue 535. In one embodiment, when multiple nondisabled subqueues are available, the front end server may randomly pick a subqueue. In an alternate embodiment, the subqueue is selected based on the number of messages stored in the subqueue. For instance, the subqueue with the most number of messages may be selected by the structured storage system 500. To balance out the suqueues and approximate FIFO, the structured storage system 500 may insert messages into the smallest queues and dequeue messages, on average, from the largest queues. In another embodiment, subqueues with older version numbers will be selected first, and the GetMessage command is executed to dequeue the messages. Accordingly, the older version subqueues may be drained by the structured storage system 500. If the number of messages obtained from the selected subqueue is zero, the structured storage system 500 selects another nondisabled subqueue. Once the structured storage system 500 iterates over all subqueues or dequeues X messages, a response that may include the X messages is returned by the structured storage system 500. In certain embodiments, when subqueues associated with the scalable queue 535 are empty, the structured storage system 500 automatically scales to reduce the number of active subqueues for the scalable queue 535. This may improve the performance of GetMessage operations when multiple subqueues of the scalable queue 535 are empty.

The PeekMessage command causes the structured storage system 500 to retrieve N messages from the scalable queue 535. The PeekMessage command receives parameters such as queue name and number of messages X. The PeekMessage command may retrieve X messages from the front of the scalable queue 535 without making the messages invisible. This command may return a message ID for each of the messages returned by the structured storage system 500. In one embodiment, the PeekMessage command may randomly select subqueues, select subqueues based on load, or select subqueues based on version. The PeekMessage command may be implemented using some procedures from the GetMessage command.

The DeleteMessage command causes the structured storage system 500 to remove messages from the scalable queue 535. The DeleteMessage command receives parameters such as queue name, message identifier, and a PopReceipt. The structured storage system 500 deletes the message associated with the PopReceipt that was returned from the earlier GetMessage command. The PopReceipt for a message may include a subqueue identifier for the subqueue that the message was dequeued from and a message identifier. The PopReceipt ensures that the DeleteMessage command is executed on the correct subqueue and message. Accordingly, the structure storage system 500 chooses the subqueue based on the data in the PopReceipt.

The ClearQueue command causes the structured storage system to delete all the messages from the given scalable queue 535. The ClearQueue command receives parameters such as queue name. In some embodiments, the ClearQueue command causes the structured storage system 500 to locate each nondisabled subqueues associated with the scalable queue 535. Each nondisabled queue is marked in the virtual queue table as "to be deleted", and then a background garbage collection processed from the queue manager cleans up the messages from the message table for that subqueue. This changes the subqueue state from nondisabled to to-be-deleted. Then a new subqueue is created to start inserting new messages. For each subqueue that is cleared by the structured storage system 500.

A dequeue operation may be performed by the structured storage system 500 in response to a GetMessage command. The dequeue operation removes the message, which effectively makes the message invisible from the structured storage system for a certain application specified interval, e.g., visibility timeout. In one embodiment, the dequeue operation causes the table server 510 to retrieve the first message in the message table that has a visibility start time less than the current time maintained by the structured storage system 500 or on the table server 510. After the table server 510 locates a message, the dequeue operation atomically deletes the original message and inserts a new message with similar content of the original message with a new visibility start time set to current time for the table server 510 plus visibility timeout. Accordingly the message becomes visible only after the visibility timeout expires. In another embodiment a message may be deleted without specifying an invisibility time.

The visibility start time of a message ensures that a message is processed at least once by a cloud application. This is because the visibility start time allows the cloud application to dequeue the message, process it, and then delete it. If the cloud application fails before it finishes deleting the message, then the message will become visible for another cloud application to dequeue. A table server 510 associated with a subqueue may dequeue messages, at 1000 messages per second. The structured storage system 500 provides an efficient means of locating visible messages that have not yet been dequeued from the scalable queue 535. When the message is dequeued by the structured storage system 500, the message becomes invisible until its visibility time has expired. In certain embodiments, the structured storage system 500 stores messages in the table sorted based on the message's visibility start time. Accordingly, a message with a visibility start time earlier than the current time at the table server 510 where the subqueue is being processed is eligible to be dequeued by the structured storage system 500. Any message with a visibility start time less than the current table server time may be dequeued for processing by the structured storage system 500.

In another embodiment, the message table may include the following: message which consists of subqueue identifier, account name, queue name, visibility start time, message identifier, expiry time, insertion time, dequeue count, body, priority of message, and subqueue count; and a QueueHead row which consists of DequeueHead, MinInsertHead, MessageCount. The QueueHead row is a unique row stored in the message table for each subqueue. There is only one per subqueue and it contains the number of messages in the subqueue (Message Count), DequeueHead and MinInsertHead. The DequeueHead is the visibility start time at which all dequeue requests start to scan from the subqueue. Most messages before this in the subqueue have been processed by dequeue requests. Accordingly, the DequeueHead is constrained to be less than or equal to current time at the table server 510 by the structured storage system 500. The DequeueHead maintains the approximate position from which the dequeue operation starts the scan of the subqueue. The DequeueHead is updated to avoid scanning over the deleted and expired rows (messages) when performing a dequeue operation for a subqueue. The DequeueHead may be stored before the first valid row for the subqueue. In certain embodiments, clock skews in the distributed structured storage system 500 may cause messages to be enqueued in the subqueue with a visibility start time behind the DequeueHead. The structured storage system may use the MinInsertHead to handle such scenarios.

The MinInsertHead is the minimum visibility start time of all concurrent insertions to the messages table of the subqueue by the structured storage system 500. The subqueue count is the number of messages stored in the subqueue.

When only dequeue operations are executed on the subqueue by the table server, there are no valid rows before the DequeueHead. The minimum of all inserted messages after the dequeue operation is the MinInsertHead. But if the structured storage system 500 fails to insert messages in the subqueue, the MinInsertHead may be updated to be greater than or equal to the DequeueHead. For instance, during a dequeue operation, the structured storage system 500 may set MinInsertHead to MaxValue, which is greater than the DequeueHead. Accordingly, the subqueue does not contain valid messages before the smallest of the MinInsertHead and DequeueHead. However, enqueue message operations that insert messages may move the MinInsertHead backward if necessary. Only a successful update of the head of the subqueue by the table server during a dequeue operation moves the MinInsertHead forward. In turn, the MinInsertHead may be updated to the smallest visibility start time of messages inserted after the end of the last dequeue operation.

The subqueue count is maintained by the table server 510. The table server 510 dynamically maintains the subqueue count to respond to a client application request for an estimate of the number of messages stored in the scalable queue 535. The table server 510 operations that modify the count are the following: insert and delete. An insert operation inserts a new message and increases the count in the subqueue by 1. A delete operation that removes one or more messages also decreases the count by one or more. For each of the operations that change the subqueue count, the structured storage system writes an IncrementQueueCount record to the log before commit, with the amount to be incremented. The change in the subqueue count is updated when committing to the memory table after a log flush.

In certain embodiments, the structured storage system 500 does not write the full value of the subqueue count to the log. Rather, the structured storage system 500 provides the delta values. When the log is replayed, the correct value is determined after the replay is complete. Every command on the messages in the scalable queue 535 is logged by the structured storage system 500. The log is used to recreate a temporary memory table stored in the memory of the table server 510. The memory table is a condensed version of all current changes to the messages in the message table associated with the subqueues of the scalable queue 535. In some embodiments, the memory table is stored in a checkpoint file by the structured storage system 500. The checkpoint file is stored persistently in the stream layer. After the memory table is stored in the checkpoint file, the log is truncated up to the time at which the memory table is stored in the checkpoint file because the data in the memory table is now persistent in the checkpoint files. In one embodiment, message operations for enqueues followed by deletes of the message may be removed by the structured storage system 500 when storing the memory table. The structured storage system may proactively delete these operations from the memory table before storing the memory table in the checkpoint file.

The blobs 530 are stored in databases executed on the physical disks of the structured storage system 500. The blobs 530 are binary large objects that may be referenced by messages in the scalable queue 535. The structured storage system 500 stores messages greater than 8 KB as blobs in the blob 530 and stores the blob name in the message table. In one embodiment, each message in the message table 520 may be up to 8 KB in size. In another embodiment, the message table may store messages greater than 8 KB.

The structured storage system 500 obtains the list of non-disabled subqueues when performing an enqueue or dequeue operation in response to PutMessage commands or GetMessage commands. The table server 510 may implement commands such as ListQueues, CreateQueue, DeleteQueue, SetQueueMetadata, or GetQueueMetadata. The namespace of these commands may include the storage account for the scalable queue 535 and may be http://<account>.queue.core.windows.net/<QueueName>.

The ListQueues command causes the structured storage system 500 to list scalable queues 535 for a given account. The CreateQueue command causes the structured storage system 500 to create a scalable queue for the given account. The DeleteQueue command causes the structured storage system 500 to permanently delete the specified scalable queue 535 and its contents. The SetQueueMetadata command causes the structured storage system to set or update the user-defined queue metadata. The user-defined queue metadata may be overwritten with the new metadata. The GetQueueMetadata command causes the structured storage system 500 to retrieve the user-defined queue metadata as well as the approximate number of messages in the specified scalable queue 535.

In certain embodiments, the CreateQueue command is issued by the queue manager 530 in response to a create scalable queue request from the cloud application. The queue manager 530 creates the scalable queue in the storage account namespace of the cloud application and sets the state to available. In turn, the structured storage system creates a single subqueue with an all-operations-allowed state.

In other embodiments, the DeleteQueue command issued by the queue manager 530 disables the scalable queue 535. When the scalable queue 535 is disabled, other commands cannot be processed on the messages in the scalable queue 535. In turn, a garbage collector deletes all of the subqueues associated with the scalable queue 535 from the cloud computing platform.

In an embodiment, the GetQueueMetadata command issued by the queue manager 530 is retrieved by summing the individual count maintained by each subqueue. The subqueue counts are collected in parallel, summed, and returned as part of the metadata.

The scalable queue 535 facilitates message delivery between processes executed by applications selected by the user. The scalable queue 535 is implemented using the tables 520 or pointers to blobs 530.

In another embodiment, front end servers may forward application requests to establish a scalable queue. The front end server send the request to the structured storage system. In turn, the structured storage system creates the scalable queue and the corresponding subqueue to process additional requests.

Figure 6:
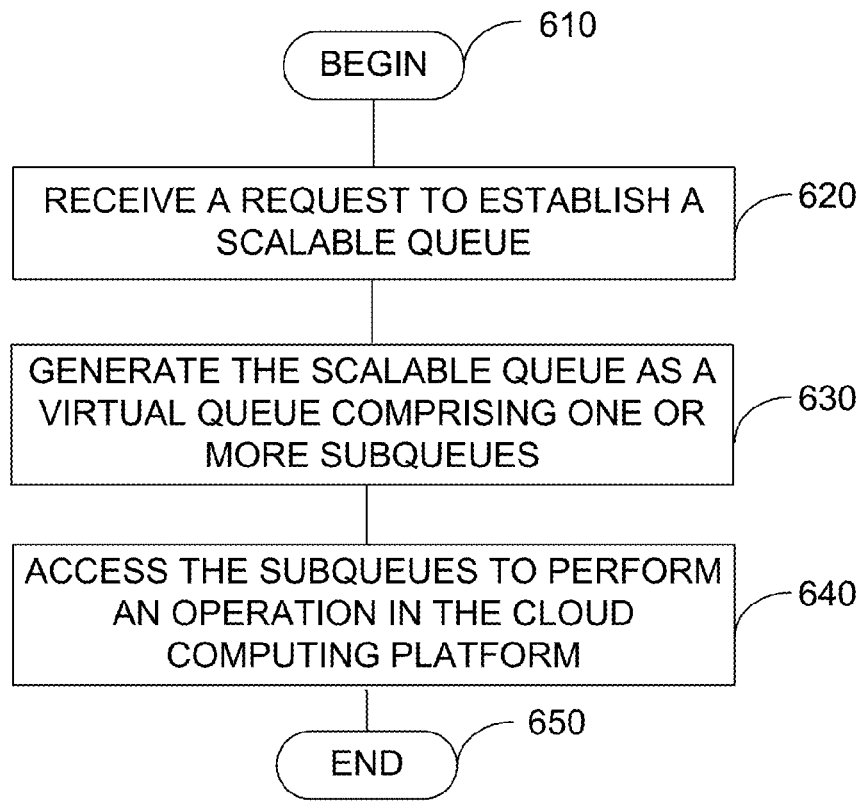
FIG. 6 is a logic diagram that illustrates a method to establish a scalable queue in accordance with embodiments of the invention.

FIG. 6 is a logic diagram that illustrates a method to establish a scalable queue in accordance with embodiments of the invention. The method initializes in step 610. The structured storage system receives a request to establish a scalable queue for an account registered with the cloud computing platform in step 620. The structured storage system is built on top of a durable, scalable and available distributed file system. In turn, the structured storage system generates the scalable queue in the cloud computing platform in response to the request, wherein the scalable queue is a virtual queue comprising one or more subqueues stored in table partitions in the distributed file system in the cloud computing platform in step 630. In step 640, the structured storage system accesses the one or more subqueues to perform an operation in the cloud computing platform. In some embodiments, accessing a queue to perform an operation in the cloud computing platform includes at least one of the following: identifying a number of subqueues associated with the virtual queue or determining a state associated with the virtual queue or a subqueue. In one embodiment, the operation is one of: put, get, delete, or peek. In turn, the structured storage system may randomly select a subqueue when performing a put, get, or peek operation. In another embodiment, the state associated with the virtual queue is one of all-operations-allowed, all-operations-except-put-allowed, and no-operations-allowed. The put operation is performed on a subqueue in an all-operations-allowed state.

Optionally, the size of each subqueue is tracked with the messages in the message table by the structured storage system. The structured storage system may alter the number of subqueues available for the virtual queue when each subqueue reaches a specified size or throughput threshold. The structured storage system may automatically increase the number of subqueues when throughput for each subqueue reaches a threshold. Alternatively, the structured storage system may increases the number of suqueues when throttling errors at the front end server reaches a threshold. To many throttling error will cause the structured storage system to increase the subqueues. On the other hand, the structured storage system may decrease the number of subqueues automatically when sizes for each subqueue reaches a second size threshold and two or more subqueues are maintained by the cloud computing platform. Additionally, the structured storage system may decrease the number of subqueues automatically when latency goes below a threshold or throttling drops below a threshold for a pre-determined length of time. The method terminates in step 650.

In summary, the cloud computing platform provides many benefits to an organization that requires additional datacenter resources. For instance, if a cloud application crashes after it dequeues a message and before it deletes the message, the message will reappear in the queue after the visibility timeout. This allows another instance of the cloud application to process the message to completion. The cloud applications share the same queue.

A cloud computing platform may run multiple instances of a cloud application to process a large number of messages in a scalable queue. A client may run two cloud applications (C1 and C2) in the cloud computing platform. C1 may dequeue a message from the scalable queue. The dequeue operation may return message 1 and set message 1 invisible in the queue for 30 seconds—the default visibility timeout. In parallel, C2 may dequeue another message off the scalable queue. Because message 1 is invisible, this dequeue operation will not see message 1 and the operation will return message 2 back to C2. When C2 completes processing of message 2, C2 may delete message 2 from the scalable queue. If C1 crashes and does not complete processing message 1, message 1 would not be deleted by C1. After message 1 has passed its visibility timeout interval, message 1 will reappear on the scalable queue. When message 1 reappears on the queue, a later dequeue call from C2 may retrieve message 1. In turn, C2 may process message 1 to completion and delete it from the scalable queue.

The structured storage system provides concurrent access to the scalable queue using a lock. A number of requests to update the DequeueHead and to select messages for dequeuing may be received by the table server for a subqueue. Each time a message is dequeued, the structured storage system locks the message and then atomically performs the above operations described for dequeue. To efficiently deal with the locking, the structured storage system uses a try lock to scan over the potentially available messages, and if a message is already being processed by a different request, the try lock skips the locked message. For instance, to perform a dequeue operation the structured storage system may try to lock the message with a DequeueSerialization lock. If the structured storage system does not acquire this lock, it does not move the DequeueHead forward. Instead the structured storage system reads the current DequeueHead, locates the first nondeleted and nonexpired message, and completes the dequeue operation normally. If the structured storage system acquired the lock, the structured storage system may write and commit a SetDequeueHead record to the log with a new DequeueHead after completing the dequeue operation. In turn, the structured storage system flushes the log and commits the new DequeueHead to the memory table. If a dequeue does not get the lock, then it is fine, since not every dequeue needs to update the DequeueHead. In certain embodiments, the DequeueHead is locked by the structured storage system and set to the minimum of the new DequeueHead and MinInsertHead. In turn, the MinInsertHead is reset to MaxValue for the next dequeue. And the lock on the dequeue head and the DequeueSerialization lock are released by the structured storage system.

Concurrent enqueue operations performed on the scalable queue are managed by the structured storage system. The structured storage system commits the insert message to the log. In turn, the structured storage system flushes the log to disk and commits the insert to the memory table. The DequeueHead is locked by the structured storage system and the DequeueHead is set to a minimum of the old DequeueHead and the new DequeueHead. In turn, the structured storage system sets the MinInsertHead to the minimum of the old MinInsertHead and the new DequeueHead. The lock on the DequeueHead is released.

The DequeueSerialization lock prevents two concurrent dequeue operations on the same subqueue received by the structured storage system from trying to move the DequeueHead forward. The structured storage system may allow a given number of dequeue operations to refrain from moving the DequeueHead. In other words, the structured storage system may search starting at an older DequeueHead and may scan over a few extra messages to get to the next available one. Accordingly, only one of the concurrent requests will have the DequeueSerialization lock and be moving the DequeueHead. In certain embodiments, each subqueue has a DequeueSerialization lock to prevent contention among concurrent Dequeue operations in a single subqueue. These features maintain the DequeueHead as close as possible to the real queue head without losing concurrency and support inserting the message behind the current DequeueHead.

The foregoing descriptions of the embodiments of the invention are illustrative, and modifications in configuration and implementation are within the scope of the current description. For instance, while the embodiments of the invention are generally described with relation to FIGS. 1-6, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. A computer-implemented method to manage a scalable queue, the method performed in a cloud computing platform and comprising:
   receiving messages to add to a scalable queue, wherein the scalable queue is a virtual queue comprising the plurality of subqueues, wherein the messages are added to the plurality of subqueues, and wherein each message comprises a visibility start time that indicates a processing order for messages in the plurality of subqueues;
   ordering the messages in each subqueue based on the visibility start time, wherein the visibility start time indicates when each message is available for dequeing; and
   obtaining one or more of the messages based on comparing a time maintained by the cloud computing platform to the visibility start time of the one or more messages, wherein one or more messages are obtained when the visibility start time of the one or more messages is earlier than the time maintained by the cloud computing platform.

2. The computer-implemented method of claim 1, wherein adding new messages to a subqueue sets the visibility start times to a time maintained by one or more table servers operating within the cloud computing platform.

3. The computer-implemented method of claim 1, wherein dequeing a message updates the visibility start time of the obtained message to the current time maintained by the cloud computing platform plus a threshold time.

4. The computer-implemented method of claim 1, wherein dequeing a message does not update the visibility start time when a cloud application deletes the message.

5. The computer-implemented method of claim 3, wherein one or more messages are not obtained when the visibility start time of the one or more messages is later than the time maintained by the cloud computing platform.

6. The computer-implemented method of claim 3, further comprising sorting the messages in each subqueue based on priority.

7. The computer-implemented method of claim 3, wherein obtaining one or more of the messages based on a time maintained by the cloud computing platform further includes obtaining messages having visibility start time less than the time maintained by the one or more table servers.

8. One or more tangible computer-readable media storing instructions to perform a method to manage a scalable queue, the method performed in a cloud computing platform and comprising:
   receiving messages to add to a scalable queue, wherein the scalable queue is a virtual queue comprising a plurality of subqueues, wherein the messages are added to the plurality of subqueues to provide automatic scaling based on a throughput load on the scalable queue, and wherein each message comprises a visibility start time that indicates a processing order for messages in the plurality of subqueues;
   ordering the messages in each subqueue based on a visibility start time, wherein the visibility start time indicates when each message is available for dequeueing; and
   obtaining one or more of the messages based on comparing a time maintained by the cloud computing platform to the visibility start time of the one or more messages.

9. The media of claim 8, wherein adding new messages to a subqueue sets the visibility start times to a time maintained by one or more table servers operating within the cloud computing platform.

10. The media of claim 8, wherein dequeing a message updates the visibility start time of the obtained message to the current time maintained by the cloud computing platform plus a threshold time.

11. The media of claim 8, wherein dequeing a message does not update the visibility start time when a cloud application deletes the message.

12. The computer-implemented method of claim 10, wherein one or more messages are not obtained when the visibility start time of the one or more messages is later than the time maintained by the cloud computing platform.

13. The media of claim 10, further comprising sorting the messages in each subqueue based on priority.

14. The media of claim 10, wherein obtaining one or more of the messages based on a time maintained by the cloud computing platform further includes obtaining messages having visibility start time less than the time maintained by the one or more table servers.

15. A system for managing a scalable queue in a cloud computing platform, the system comprising:
a front end server for:
receiving messages to add to a scalable queue, wherein the messages are added to a plurality of subqueues, wherein each message comprises a visibility start time that indicates a processing order for messages in the plurality of subqueues;
ordering the messages in each subqueue based on the visibility start time, wherein the visibility start time indicates when each message is available for dequeueing; and
obtaining one or more of the messages based on comparing a time maintained by the cloud computing platform to the visibility start time of the one or more messages.

16. The system of claim 15, wherein one or more table servers are operated within the cloud computing platform, the one or more table servers configured for maintaining a time on which visibility start times are set to when adding new messages to a subqueue.

17. The system of claim 15, wherein one or more table servers are configured to maintain a current time to which a threshold time is added, in order to update the visibility start time of the one or more obtained messages when the one or more obtained messages is dequeued.

18. The system of claim 15, wherein one or more table servers are configured to maintain a visibility start time that is not updated when a cloud application deletes the message.

19. The system of claim 17, wherein the one or more table servers are further configured to store the messages that are sorted in each subqueue based on priority.

20. The system of claim 17, wherein the one or more table servers are further configured to maintain a time, wherein messages having a visibility start time less than the time maintained by the one or more table servers are obtained.

* * * * *